United States Patent
Schill

(10) Patent No.: US 8,929,112 B2
(45) Date of Patent: Jan. 6, 2015

(54) CIRCUIT ARRANGEMENT HAVING A BOOST CONVERTER, AND INVERTER CIRCUIT HAVING SUCH A CIRCUIT ARRANGEMENT

(75) Inventor: Christoph Schill, Ravensburg (DE)

(73) Assignee: Platinum GmbH, Wangen (DE)

( * ) Notice: Subject to any disclaimer, the term of this patent is extended or adjusted under 35 U.S.C. 154(b) by 534 days.

(21) Appl. No.: 13/017,060

(22) Filed: Jan. 31, 2011

(65) Prior Publication Data

US 2011/0188276 A1    Aug. 4, 2011

(30) Foreign Application Priority Data

Jan. 29, 2010  (DE) .......................... 10 2010 006 124

(51) Int. Cl.
*H02M 1/12* (2006.01)
*H02M 3/158* (2006.01)
*H02J 3/38* (2006.01)
*H02M 1/00* (2006.01)

(52) U.S. Cl.
CPC ............... *H02J 3/383* (2013.01); *H02M 3/158* (2013.01); *H02M 2001/0077* (2013.01); *Y02E 10/563* (2013.01)
USPC .......................................................... 363/131

(58) Field of Classification Search
USPC ........................................ 363/15–16, 40, 131
See application file for complete search history.

(56) References Cited

U.S. PATENT DOCUMENTS

| | | | |
|---|---|---|---|
| 3,459,957 A | 8/1969 | Kelley | |
| 6,747,881 B2* | 6/2004 | Schreiber | ........................ 363/37 |
| 6,963,497 B1 | 11/2005 | Herbert | |
| 7,646,182 B2 | 1/2010 | Nakabayashi et al. | |
| 7,741,817 B2 | 6/2010 | Lasagni | |
| 8,116,103 B2* | 2/2012 | Zacharias et al. | ............... 363/17 |
| 2005/0270816 A1* | 12/2005 | Nielsen | ......................... 363/142 |

FOREIGN PATENT DOCUMENTS

| | | |
|---|---|---|
| DE | 102004037446 A1 | 6/2006 |
| DE | 102006014780 A1 | 10/2007 |
| DE | 102008050402 A1 | 4/2010 |
| EP | 2001111 A2 | 12/2008 |
| WO | 2006106417 A1 | 10/2006 |

\* cited by examiner

*Primary Examiner* — Adolf Berhane
*Assistant Examiner* — Henry Lee, III
(74) *Attorney, Agent, or Firm* — Laurence A. Greenberg; Werner H. Stemer; Ralph E. Locher

(57) ABSTRACT

An inverter circuit contains a first and second DC sources for providing a DC voltage, a common boost converter for boosting the DC voltage, an intermediate circuit capacitor connected between the outputs of the common boost converter, and an inverter for converting the DC voltage provided by the capacitor into an AC voltage. The common boost converter contains a series circuit having a first inductance and a first rectifier element and is connected between an output of the first DC source and one side of the intermediate circuit capacitor as well as a series circuit which includes a second inductance and a second rectifier element and is connected between an output of the second DC source and another side of the intermediate circuit capacitor. The common boost converter further contains a common switching element formed by at least two circuit-breakers which are connected between the first and second DC sources.

10 Claims, 3 Drawing Sheets

FIG. 1
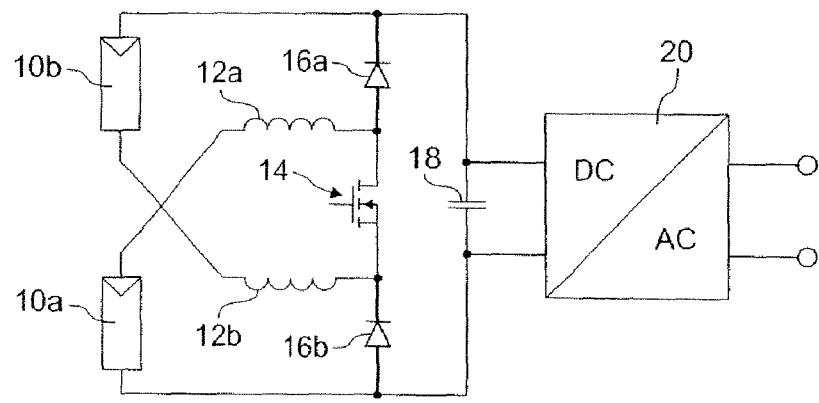
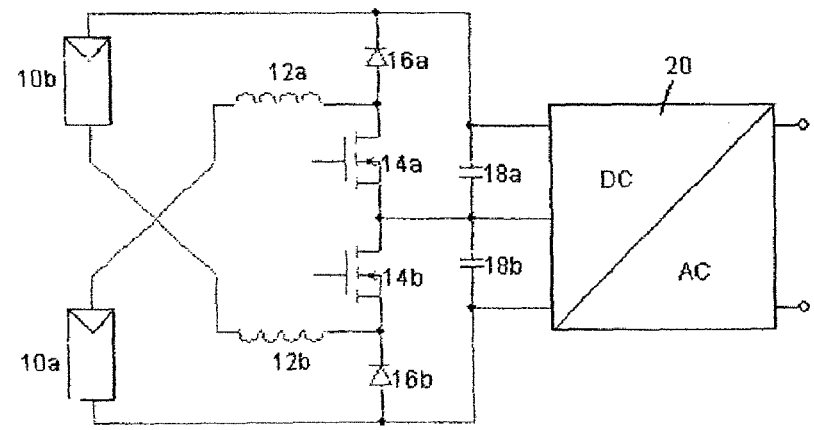
FIG. 3

CIRCUIT ARRANGEMENT HAVING A BOOST CONVERTER, AND INVERTER CIRCUIT HAVING SUCH A CIRCUIT ARRANGEMENT

CROSS-REFERENCE TO RELATED APPLICATION

This application claims the priority, under 35 U.S.C. §119, of German application DE 10 2010 006 124.7, filed Jan. 29, 2010; the prior application is herewith incorporated by reference in its entirety.

BACKGROUND OF THE INVENTION

Field of the Invention

The present invention relates to a circuit arrangement having a boost converter for boosting a provided DC voltage and to an inverter circuit having such a circuit arrangement. The present invention relates, in particular, to a circuit arrangement having a boost converter for boosting a DC voltage provided by a photovoltaic generator and to a solar inverter circuit having such a circuit arrangement.

In order to generate an AC voltage, an inverter generally requires an intermediate circuit voltage of a particular magnitude. An optimum degree of efficiency is achieved if this intermediate circuit voltage is precisely matched to the AC voltage to be generated.

Photovoltaic generators usually provide a greatly fluctuating DC voltage depending on the incidence of light, the temperature and the number of connected modules. The broader the operating range of the input DC voltage which can be processed by an inverter, the more possibilities there are of finding appropriate module combinations during installation. An input voltage range of 1:2 at full load and of 1:2.5 from full load to no-load operation is often desirable.

In order to match the DC voltage provided by the photovoltaic generator to the inverter, a circuit arrangement having a so-called boost converter which boosts the variable DC voltage to a relatively constant intermediate circuit voltage is therefore generally used. The structure of a conventional standard inverter circuit (step-up converter) is illustrated in FIG. 4.

A photovoltaic generator 10 provides a variable DC voltage. The boost converter which contains an inductor 12, a switching element which may function as a circuit-breaker 14 and a diode 16 is used to boost the voltage to the intermediate circuit voltage which is applied to an intermediate circuit capacitor 18. The downstream inverter 20 then converts the intermediate circuit voltage into an AC voltage.

In order to boost the DC voltage from the photovoltaic generator 10, the switching element 14 is periodically switched on and off. In this case, the duty ratio is selected using an analogue or digital controller in such a manner that the desired intermediate circuit voltage is set. When the switching element 14 is closed, current flows from the photovoltaic generator 10 into the inductor 12 and is buffered there. If the switching element 14 is then opened, the current flows from the photovoltaic generator 10 into the intermediate circuit capacitor 18 via the diode 16, the energy previously stored in the inductor 12 also being delivered to the intermediate circuit capacitor 18.

FIG. 5 shows a development of this standard inverter circuit, as is known, for example, from published, non-prosecuted German patent application IDE 10 2004 037 446 A1. The inverter circuit illustrated in FIG. 5 differs from the standard circuit from FIG. 4 by the symmetrical arrangement of two inductors 12a and 12b and the additional diode 16b which is required for reasons of symmetry. The method of operation of this inverter circuit is the same as that of the standard inverter circuit described above. The symmetrical distribution of the inductors 12a, 12b causes the photovoltaic generator 10 to be at another voltage level with respect to earth, which is desired in particular types of solar modules.

However, the use of a boost converter in an inverter circuit also results in losses which reduce the overall efficiency of the inverter circuit. In the modified circuit arrangement from FIG. 5, there are also losses of the second diode 16b, as a result of which the overall efficiency becomes even lower. In addition, the use of a boost converter is always also associated with additional weight, volume and costs.

The mentioned problems of these conventional circuit arrangements also occur in other types of DC sources and when the DC voltage provided is used directly, that is to say without the use of the inverter.

U.S. Pat. No. 3,459,957 A shows a circuit arrangement having batteries as the DC source. The batteries can be connected either in series or in parallel with one another using a switch formed by a transistor. A capacitor sums the voltage dropped across it. A coil is provided in this case and is arranged after combining the branches respectively formed from one of the batteries and one of the diodes.

SUMMARY OF THE INVENTION it is accordingly an object of the invention to provide a circuit arrangement having a boost converter, and an inverter circuit having such a circuit arrangement which overcomes the above-mentioned disadvantages of the prior art devices of this general type. The invention is based on the object of providing an improved circuit arrangement having a DC source and a boost converter.

The circuit arrangement contains a DC source for providing a DC voltage, a boost converter for boosting the DC voltage provided by the DC source, and an intermediate circuit capacitor which is connected between the outputs of the boost converter. In this case, the DC source has a first DC source and a second DC source, and the boost converter is provided as a common boost converter for boosting both the DC voltage provided by the first DC source and the DC voltage provided by the second DC source. The common boost converter also contains a series circuit which consists of a first inductance (for example an inductor) and a first rectifier element (for example a freewheeling diode or an active switching element) and is connected between an output of the first DC source and one side of the intermediate circuit capacitor as well as a series circuit which contains a second inductance and a second rectifier element and is connected between an output of the second DC source and another side of the intermediate circuit capacitor. According to the invention, the common switching element of the common boost converter for the first and second DC sources is formed by at least two switching elements which are connected between the first and second DC sources, preferably between the connection between the first inductance and the first rectifier element and the connection between the second inductance and the second rectifier element.

In this circuit arrangement, a common boost converter is used for a first DC source and a second DC source. As a result, the energy which must be buffered in the boost converter or the circulating reactive power is considerably smaller. As a result, the losses of the boost converter are considerably reduced, thus increasing the overall efficiency of the circuit arrangement. Further advantages lie in a reduced cooling capacity on account of the better efficiency, a reduction in the load on the semiconductor components of the boost converter, lower requirements when designing the individual components and a relatively small number of components needed to achieve a high degree of efficiency.

In particular, the common boost converter may contain a common switching element which is connected between the first and second DC sources. The common switching element is connected, for example, between the connection between the first inductance and the first rectifier element and the connection between the second inductance and the second rectifier element. In addition, the common switching element is preferably a switching element which can be clocked at a fixed or variable frequency.

Furthermore, the first and second DC sources may be partial current sources of a DC source which are connected in parallel or in series. For example, the first and second DC sources are different (partial) strings of a solar module or a photovoltaic generator.

Furthermore, the first and second inductances of the common boost converter may either be coupled to one another or formed separately from one another.

The above-described circuit arrangement of the invention can advantageously be used in an inverter circuit which, in addition to this circuit arrangement, has an inverter for converting the DC voltage provided by the intermediate circuit capacitor into an AC voltage. In this case, two or more boost converters connected in parallel or in series may also be connected to the input connections of the inverter or to the intermediate circuit capacitor.

The use of at least two switching elements (that is to say two, three, four or more switching elements) for the common switching element of the common boost converter makes it possible to considerably reduce the voltage load on the individual semiconductor components in each case. With a suitable choice of components, this may result in better efficiency of the overall circuit arrangement.

In one preferred refinement of the invention, the at least two switching elements are connected between the connection between the first inductance and the first rectifier element and the connection between the second inductance and the second rectifier element.

In another refinement of the invention, the intermediate circuit capacitor is formed by at least two capacitances connected in series (that is to say two, three, four or more capacitances).

In yet another refinement of the invention, a connection between two capacitances of the intermediate circuit capacitor is connected to a connection between two switching elements of the common switching element.

Furthermore, the at least two switching elements of the common switching element may be synchronously clocked.

Alternatively, the at least two switching elements of the common switching element may be clocked separately.

The circuit arrangement according to the invention can be advantageously used in an inverter circuit which, in addition to the circuit arrangement, has an inverter for converting the DC voltage provided by the intermediate circuit capacitor into an AC voltage.

In one refinement of the invention, the intermediate circuit capacitor is formed by at least two capacitances connected in series, and the inverter is connected to a connection between two capacitances of the intermediate circuit capacitor.

In another refinement of the invention, at least two boost converters connected in parallel or in series are connected to the input connections of the inverter or to the intermediate circuit capacitor.

Other features which are considered as characteristic for the invention are set forth in the appended claims.

Although the invention is illustrated and described herein as embodied in a circuit arrangement having a boost converter, and an inverter circuit having such a circuit arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a schematic illustration of a structure of an inverter circuit;

FIG. 3 is a schematic illustration of the structure of an inverter circuit according to an exemplary embodiment according to the invention;

DETAILED DESCRIPTION OF THE INVENTION

Figure 2:
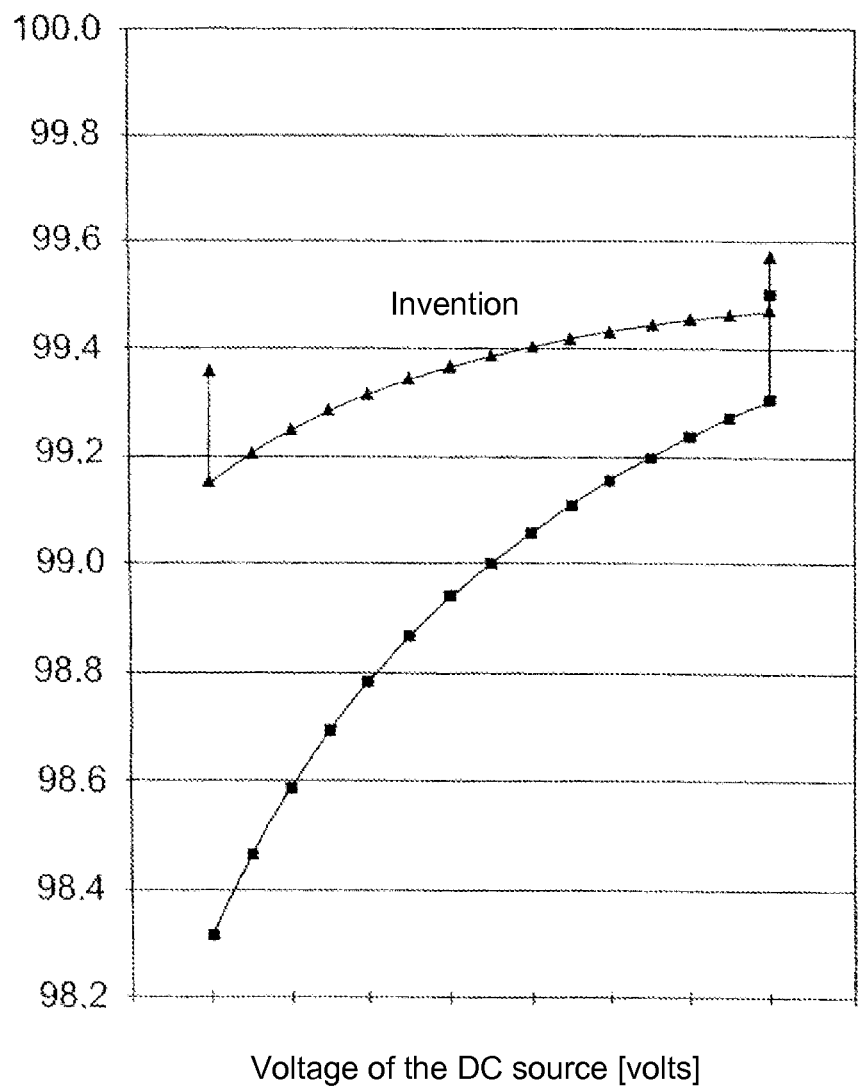
FIG. 2 is a graph illustrating an improvement in efficiency of the inverter circuit from FIG. 1 in comparison with prior art circuit arrangements.

Referring now to the figures of the drawing in detail and first, particularly, to FIG. 1 thereof, there is shown a structure of an inverter circuit.

The photovoltaic generator which forms the DC source is divided into two (partial) strings 10a, 10b which each provide a DC voltage. The first and second DC sources 10a, 10b are preferably symmetrical, that is to say they generate essentially the same DC voltage in order to achieve the best results. The voltage in each string 10a, 10b at full load is typically in the range between approximately 50% and approximately 100% of the intermediate circuit voltage. This achieves an input voltage range of approximately 1:2 at full load.

The division of a photovoltaic generator 10 into two partial strings 10a and 10b is not a restriction in higher-power inverters since a plurality of identical partial strings are usually connected in parallel anyway.

Both DC sources 10a, 10b are connected to a common boost converter 12-16, downstream of which an intermediate circuit capacitor 18 and finally an inverter 20 are connected. As illustrated in FIG. 1, the common boost converter 12-16 contains a series circuit which has a first inductor 12a and a first diode 16a and is connected between an output of the first DC source 10a and one side of the intermediate circuit capacitor 18 as well as a series circuit which has a second inductor 12b and a second diode 16b and is connected between an output of the second DC source 10b and another side of the intermediate circuit capacitor 18.

Figure 4:
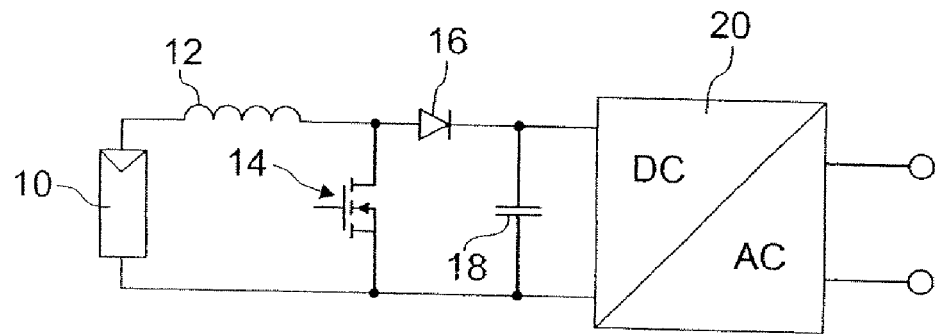
FIG. 4 is a schematic illustration of the structure of a conventional inverter circuit according to the prior art.

The common boost converter 12-16 also contains a common switching element 14 which is connected between the first and second DC sources 10a, 10b in such a manner that it is connected between the connection between the first inductor 12a and the first diode 16a and the connection between the second inductor 12b and the second diode 16b. In this manner, the two DC sources 10a, 10b are in series when the switching element 14 is closed and are in parallel when the switch 14 is open via the first and second diodes 16a, 16b. In contrast to the conventional circuit arrangements from FIG. 4 and FIG. 5, energy is delivered into the intermediate circuit capacitor 18 both when the switching element 14 is closed and when the switching element 14 is open.

As a result, the energy which must be buffered in the inductors 12a, 12b of the boost converter 12-16 or the reactive power circulating in the boost converter is considerably smaller. Consequently, the two inductors 12a, 12b must be only approximately half as large and the load on the switching element 14 and also other semiconductor components is reduced. The losses in the boost converter are considerably reduced, the overall efficiency of the inverter circuit is greater and the cooling capacity required is lower.

If the DC voltage in the two strings 10a, 10b is approximately 50% or approximately 100% of the desired intermediate circuit voltage, a static series or parallel connection of the two DC sources 10a, 10b suffices to generate the intermediate circuit voltage. No switching losses are therefore produced in the switching element 14. If the DC voltages in the two strings 10a, 10b are each in the range between approximately 50% and 100% of the intermediate circuit voltage, the switching element 14 is operated in a clocked manner. The duty ratio is controlled using a controller (not illustrated, analog or digital, for example a conventional PWM control circuit) in such a manner that the desired intermediate circuit voltage is produced. The duty ratio may vary between 100% (that is to say static series connection of 10a and 10b) and 0% (that is to say static parallel connection of 10a and 10b).

Figure 5:
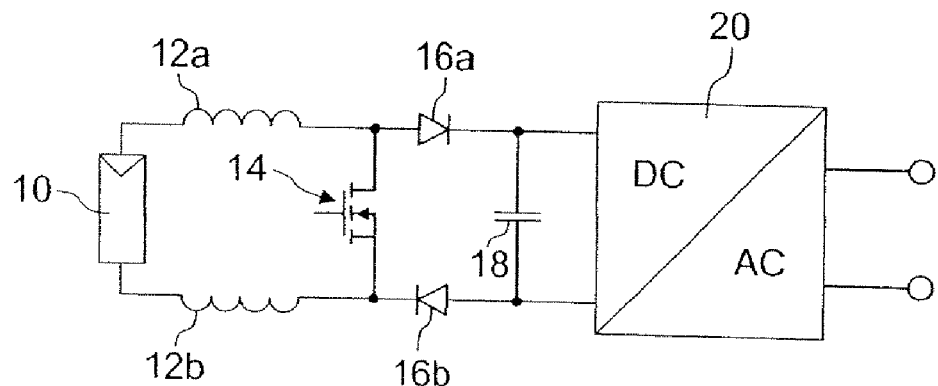
FIG. 5 is a schematic illustration of the structure of a further conventional inverter circuit according to the prior art.

In order to illustrate the improved method of operation of this circuit arrangement in comparison with conventional circuit arrangements having boost converters, FIG. 2 shows a comparison of the efficiencies of the boost converters against the DC voltages provided by the current sources. The overall efficiencies of the boost converters 12-16 for the conventional circuit arrangement from FIG. 4 (shown as curve ■ in FIG. 2) and for the circuit arrangement from FIG. 1 (shown as curve ▲ in FIG. 2) are plotted for the operating conditions of full load, a constant clock frequency of the switching element 14 and an intermediate circuit voltage of 700 volts. The overall efficiency of the modified conventional circuit arrangement from FIG. 5 is somewhat below that from FIG. 4.

It is noted that, for a DC voltage of 700 volts, the boost converter 12-16 is not clocked, as a result of which the switching losses of the switching element 14 are omitted in both cases. In the circuit arrangement from FIG. 1, this is also possible at a DC voltage of 350 volts as a result of the static series connection of the two partial strings 10a, 10b.

FIG. 2 clearly shows that the efficiency of the boost converter and thus also the overall efficiency of the inverter circuit could be considerably improved by the circuit arrangement from FIG. 1 with a small outlay on components. In addition, it can also be stated that the dependence of the efficiency or the losses of the boost converter on the DC voltage provided by the photovoltaic generator 10 is considerably smaller.

The circuit-breaker 14 can be driven either at a fixed or at a variable frequency. If the DC voltage in the partial strings 10a, 10b is in the vicinity of 50% or 100% of the intermediate circuit voltage, the clock frequency of the switching element 14 can be reduced, for example, in order to reduce the switching losses. At values of 50% and 100% of the desired intermediate circuit voltage, the boost converter is preferably not clocked but rather the two DC sources 10a, 10b are operated in a manner statically connected in parallel or in series. With such static operation, the semiconductors can be bridged with a relay, for example, in order to increase the efficiency further.

An exemplary embodiment of a circuit arrangement according to the invention is explained in more detail below with reference to FIG. 3. In this case, identical or corresponding components are denoted using the same reference numerals as in the circuit arrangement from FIG. 1.

The circuit arrangement in this exemplary embodiment differs from the circuit arrangement, as shown in FIG. 1, in that two switching elements 14a and 14b are connected between the first and second DC sources 10a, 10b, more precisely between the connection between the first inductor 12a and the first diode 16a and the connection between the second inductor 12b and the second diode 16b. In other words, the common switching element 14 of the common boost converter 12-16 is formed by two switching elements 14a, 14b.

In a similar manner, the intermediate circuit capacitor 18 is also formed from two capacitances 18a and 18b connected in series.

Furthermore, a connection between the two switching elements 14a, 14b is connected in an electrically conductive manner to a connection between the two capacitances 18a, 18b. Moreover, the inverter 20 is additionally connected to the center tap between the two capacitances 18a, 18b.

The voltage load on the semiconductor components used in the circuit arrangement can be halved in this manner. This in turn allows even better efficiency of the inverter circuit if the components are selected in a correspondingly suitable manner.

In one embodiment, the two circuit-breakers 14a, 14b may be synchronously clocked. In this case, the two inductors 12a, 12b may be either separate or coupled.

This variant exhibits a similar behavior to the circuit arrangement from FIG. 1 having only one switching element 14. However, additional mutual influence with the inverter 20 is obtained via the center tap between the two capacitances 18a, 18b.

In another embodiment, the two switching elements 14a and 14b are clocked separately and the two inductors 12a and 12b are also separate.

In the case of different solar radiation for the two strings 10a and 10b of the photovoltaic generator 10, asymmetry occurs between the voltages provided by the two capacitances 18a, 18b of the intermediate circuit capacitor, which asymmetry must be compensated for by the downstream inverter 20. In this case, the maximum permissible asymmetry depends on the photovoltaic voltage in the strings 10a, 10b and the ability of the inverter 20 to stabilize the neutral point between the two capacitances 18a, 18b.

In this second embodiment variant, it is possible to use separate drive devices for the two switching elements 14a, 14b, for example in the form of MPPTs (maximum power point tracker). However, the control of the circuit arrangement becomes somewhat more complicated overall.

The invention is naturally not only restricted to the exemplary embodiment described above. A person skilled in the art will immediately recognize various modifications and variants which are within the scope of protection defined by the appended claims.

For example, it is conceivable to operate with different partial strings 10a, 10b by using different numbers of solar modules in the partial strings, for example. The boost converter circuit 12-16 can also be configured for this situation without any problems even if the improvement in the efficiency diminishes with increasing asymmetry.

The two DC sources or (partial) strings 10a, 10b may consist either of DC sources connected in parallel or DC sources connected in series.

Instead of the diodes, active circuit-breakers may also be optionally used as the first and second rectifier elements 16a, 16b.

Whereas two switching elements 14a, 14b and two capacitances 18a, 18b are used for the common switching element and the intermediate circuit capacitor, respectively, in the exemplary embodiment from FIG. 3, it is likewise possible to respectively use three, four or more of these components.

The boost converter 12-16 may also be constructed from two or more branches which operate in a parallel manner and possibly with a phase offset (multi-phase operation). In this case, individual branches may be entirely disconnected in the event of a partial load in order to increase the partial load efficiency.

In order to reduce the switching losses, ring-around networks may optionally be installed (resonant switching).

Furthermore, two or more boost converters 12-16 may also be connected in parallel or in series at the input of the inverter 20.

Different topologies may be used for the inverter 20 itself. Half-bridges (for single-phase supply) and three-phase bridges are suitable, for example.

Instead of the photovoltaic generators described above, other supplying sources may also be used for the first and second DC sources 10a, 10b. For example, fuel cells, thermoelectric generators, electromagnetic generators, rechargeable batteries, supercapacitors and the like are also suitable as DC sources of the circuit arrangement according to the invention.

The circuit arrangement according to the invention having DC sources 10a, 10b, a boost converter 12-16 and an intermediate circuit capacitor 18a, 18b cannot only be used in combination with the downstream inverter 20, as illustrated in FIG. 3. The circuit arrangement of the invention can advantageously also be used, for example, to directly supply DC loads or to supply DC voltage intermediate circuits in other devices, for example motor frequency converters.

The invention claimed is:

1. A circuit configuration, comprising:
   a DC source having a first DC source with a first output providing a DC voltage and a second DC source with a first output providing a DC voltage;
   a boost converter having outputs, said boost converter being a common boost converter for boosting both the DC voltage provided by said first DC source and the DC voltage provided by said second DC source, said common boost converter containing a common switching element having at least two switching elements connected between said first and second DC sources; and
   an intermediate circuit capacitor connected between said outputs of said boost converter, said intermediate circuit capacitor having a first side and a second side;
   said boost converter including a first series circuit having a first inductance and a first rectifier element connected in series with said first inductance, said first series circuit connected between said first output of said first DC source and said first side of said intermediate circuit capacitor;
   said boost converter including a second series circuit having a second inductance and a second rectifier element connected in series with said second inductance, said second series circuit connected between said first output of said second DC source and said second side of said intermediate circuit capacitor;
   said first DC source having a second output non-switchably connected to said second rectifier element and to said second side of said intermediate circuit capacitor during operation of said boost converter, and said second DC source having a second output non-switchably connected to said first rectifier element and to said first side of said intermediate circuit capacitor during operation of said boost converter; and
   said at least two switching elements connected between a connection between said first inductance and said first rectifier element and a connection between said second inductance and said second rectifier element in such a manner that said two DC sources are in series when all of said at least two switching elements are closed and said two DC sources are in parallel when all of said at least two switching elements are open.

2. The circuit arrangement according to claim 1, wherein said intermediate circuit capacitor has at least two capacitances connected in series.

3. The circuit arrangement according to claim 2, wherein a connection between said at least two capacitances of said intermediate circuit capacitor is connected to a connection between said at least two switching elements of said common switching element.

4. The circuit arrangement according to claim 1, wherein said at least two switching elements of said common switching element are synchronously clocked.

5. The circuit arrangement according to claim 1, wherein said at least two switching elements of said common switching element are clocked separately.

6. An inverter circuit, comprising:
   a circuit configuration, including:
      a DC source having a first DC source with a first output providing a DC voltage and a second DC source with a first output providing a DC voltage;
      a boost converter having outputs, said boost converter being a common boost converter for boosting both the DC voltage provided by said first DC source and the DC voltage provided by said second DC source, said common boost converter containing a common switching element formed by at least two switching elements connected between said first and second DC sources; and
   an intermediate circuit capacitor connected between said outputs of said boost converter, said intermediate circuit capacitor having a first side and a second side; and
   an inverter for converting a further DC voltage provided by said intermediate circuit capacitor into an AC voltage;
   said boost converter including a first series circuit having a first inductance and a first rectifier element connected in series with said first inductance, said first series circuit connected between said first output of said first DC source and said first side of said intermediate circuit capacitor;
   said boost converter including a second series circuit having a second inductance and a second rectifier element connected in series with said second inductance, said second series circuit connected between said first output of said second DC source and said second side of said intermediate circuit capacitor;
   said first DC source having a second output non-switchably connected to said second rectifier element and to said second side of said intermediate circuit capacitor during operation of said boost converter, and said second DC source having a second output non-switchably connected to said first rectifier element and to said first side of said intermediate circuit capacitor during operation of said boost converter; and said at least two switching elements connected between a connection between said first inductance and said first rectifier element and a connection between said second inductance and said second rectifier element in such a manner that said two DC sources are in series when all of said at least two switching elements are closed and said two DC sources are in parallel when all of said at least two switching elements are open.

7. The inverter circuit according to claim 6, wherein:
said intermediate circuit capacitor is formed by at least two capacitances connected in series; and
said inverter is connected to a connection between said at least two capacitances of said intermediate circuit capacitor.

8. The inverter circuit according to claim 6, wherein:
said inverter has input connections; and
said boost converter is one of at least two boost converters connected in one of parallel or in series and connected to said input connections of said inverter or to said intermediate circuit capacitor.

9. The circuit arrangement according to claim 1, wherein:
said first rectifier element is a first diode having a cathode connected to said first side of said intermediate capacitor and to said second output of said second DC source; and
said second rectifier element is a second diode having an anode connected to said second side of said intermediate capacitor and to said second output of said first DC source.

10. The inverter circuit according to claim 6, wherein:
said first rectifier element is a first diode having a cathode connected to said first side of said intermediate capacitor and to said second output of said second DC source; and
said second rectifier element is a second diode having an anode connected to said second side of said intermediate capacitor and to said second output of said first DC source.

* * * * *